United States Patent Office 3,023,221
Patented Feb. 27, 1962

3,023,221
NOVEL 2-(3-INDOLYL)-1,4-BUTANEDIOLS AND 2-(3-INDOLYL)-1,4-BUTANEDIOL DICARBAMATES
Jacob Szmuszkovicz, Portage Township, Kalamazoo County, and William C. Anthony, Kalamazoo, Mich., assignors to The Upjohn Company, Kalamazoo, Mich., a corporation of Michigan
No Drawing. Filed May 11, 1960, Ser. No. 28,254
18 Claims. (Cl. 260—319)

The present invention relates to novel organic compounds and is more particularly concerned with novel 2-(3-indolyl)-1,4-butanediols and 2-(3-indolyl)-1,4-butanediol dicarbamates.

The novel 2-(3-indolyl)-1,4-butanediols and 2-(3-indolyl)-1,4-butanediol dicarbamates of the present invention can be represented by the following formula:

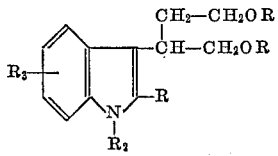

I wherein R represents hydrogen and carbamyl

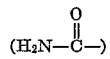

$R_1$ represents hydrogen; alkyl containing from 1 to 4 carbon atoms, inclusive, e.g., methyl, ethyl, propyl, isopropyl, butyl, isobutyl, and the like; phenyl; hydroxyphenyl, e.g., p-hydroxyphenyl, m-hydroxyphenyl, 2,3-dihydroxyphenyl, 3,4-dihydroxyphenyl, 2,3,4-trihydroxyphenyl, and the like; alkoxyphenyl wherein the alkoxy moiety contains from 1 to 4 carbon atoms, inclusive, e.g., p-methoxyphenyl, p-ethoxyphenyl, m-butoxyphenyl, o-propoxyphenyl, 2,3,4-triethoxyphenyl, 3,4 - dimethoxyphenyl, 3,4,5-trimethoxyphenyl, and the like; halophenyl, e.g., p-chlorophenyl, p-bromophenyl, p-iodophenyl, p-fluorophenyl, 3,4-dichlorophenyl, 2,3,4-tribromophenyl, and the like. $R_2$ represents hydrogen and alkyl containing from 1 to 4 carbon atoms, inclusive, e.g., methyl, ethyl, propyl, butyl, isobutyl, and the like. $R_3$ represents hydrogen, hydroxy, benzyloxy, and alkoxy containing from 1 to 4 carbon atoms, inclusive, e.g., methoxy, ethoxy, propoxy, butoxy, and the like.

In the preparation of the hydroxy-substituted compounds such as 2-(5-hydroxy-3-indolyl)-1,4-butanediol, it is advantageous to prepare the corresponding benzyloxy derivative such as 2-(5-benzyloxy-3-indolyl)-1,4-butanediol, and to subsequently convert the benzyloxy radical to a hydroxy radical by means hereinafter recited.

The novel 2-(3-indolyl)-1,4-butanediols and dicarbamates thereof (Formula I above) of the invention show valuable pharmacological activities in mammals and animals of economic value. Illustratively, the novel compounds of the invention possess activity as central nervous system depressants. For example, the compounds exhibit hypnotic, anticonvulsant, tranquillizing, and drug potentiating activity useful in prolonging the effect of sedatives and hypnotics in laboratory animals such as rats, mice, and the like. The novel compounds are also useful in depressing motor activity in such animals.

The novel compounds can be combined with solid or liquid pharmaceutical carriers and formulated as tablets, powder packs, or capsules, or dissolved or suspended in suitable solvents for oral or parenteral administration.

In addition, the compounds of the invention exhibit high absorption of radiation in the wavelength range of 280–300 millimicrons and accordingly can be employed as effective sun screens when incorporated in suitable vehicles such as transparent film forming compositions and oils.

The novel 2-(3-indolyl)-1,4-butanediols with the exception of the hydroxy-substituted compounds as hereinbefore recited are prepared by lithium aluminum hydride reduction of 3-indolesuccinic acids or dialklyl 3-indolesuccinates (preferred), or mixtures thereof, the said acids and dialkyl esters being represented by the following formula:

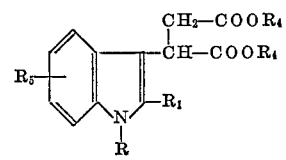

II wherein $R_1$ and $R_2$ have the values noted above; $R_4$ represents hydrogen and alkyl containing from 1 to 4 carbon atoms, inclusive; and $R_5$ represents hydrogen, benzyloxy, and alkoxy containing from 1 to 4 carbon atoms, inclusive. The reduction is advantageously carried out in the presence of an inert solvent such as diethyl ether, tetrahydrofuran, dibutyl ether, and the like, with tetrahydrofuran generally being preferred, at temperatures between about 0° C. and about 100° C., preferably between about 35° C. and about 80° C. In many instances it is very convenient and satisfactory to carry out the reduction at the boiling point of the reaction mixture, e.g., when employing tetrahydrofuran as the inert solvent. After a suitable reaction period, usually from about 30 minutes to 7 hours, the 2-(3-indolyl)-1,4-butanediol product can be recovered by conventional techniques, e.g., by hydrolyzing the reaction mixture with aqueous ether followed by dilute alkali, filtering, and concentrating the filtrate.

The novel hydroxy-substituted compounds can be prepared by hydrogenolysis of the corresponding benzyloxy-substituted compounds. The hydrogenolysis can be advantageously carried out in the presence of a palladium catalyst such as palladium black, palladium-barium sulfate, palladium-charcoal and the like, in the manner more fully disclosed in U.S. Patent 2,708,197.

The novel 2-(3-indolyl)-1,4-butanediols can be readily converted to novel and useful dicarbamates by conventional methods such as are disclosed in U.S. Patents 2,917,536 and 2,884,444. For example, the dicarbamates can be prepared by reacting the butanediols with an aryl chloroformate, such as phenyl chloroformate, in the presence of a tertiary organic base, and treating the resulting product with liquid ammonia.

The dialkyl 3-indolesuccinates (Formula II above in which $R_4$ is alkyl) utilized to produce the novel 2-(3-indolyl)-1,4-butanediols are prepared by esterification of 3-indolesuccinic acids (Formula II above in which $R_4$ is hydrogen), utilizing conventional esterification means. For example, diazoalkanes, e.g., diazomethane, diazoethane, diazobutane, and the like, can be utilized in accordance with the procedure of Diels and Alder, Ann. 490, 277, 1931. Alternatively, esterification of the 3-indolesuccinic acids can be carried out utilizing alkanols, e.g., methanol, ethanol, isopropanol, butanol, and the like, in the presence of a catalyst, e.g., sulfuric acid, p-toluene-sulfonic acid, and the like.

The 3-indolesuccinic acids (Formula II above in which $R_4$ is hydrogen) can be prepared by two procedures depending on whether $R_1$ is hydrogen or other than hydrogen. For example, when $R_1$ is other than hydrogen the 3-indolesuccinic acids can be prepared by condensing a 3-unsubstituted indole represented by the following formula:

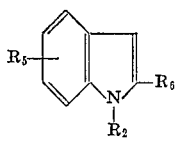

wherein $R_2$ and $R_5$ have the values noted above and $R_6$ represents alkyl, phenyl, hydroxyphenyl, alkoxyphenyl, and halophenyl, with maleic anhydride or maleic acid in accordance with the procedure of Diels and Alder, supra. The resulting reaction mixture is allowed to stand for about 15 to 120 minutes and aqueous alkali, e.g., sodium hydroxide, potassium hydroxide, sodium carbonate, and the like, is added to the mixture. The alkaline mixture is heated, suitably to between about 50° C. and about 100° C. for a period between about 30 minutes to about 1 hour, cooled, and decanted. The aqueous solution thus obtained is acidified, e.g., with hydrochloric acid, sulfuric acid, phosphoric acid, hydrobromic acid, and the like. After standing for several hours, e.g., 2 to 12 hours, the 3-indolesuccinic acid is recovered by filtration.

Where $R_1$ is hydrogen the 3-indolesuccinic acids are prepared by the procedure of Perron et al., J. Org. Chem. 24, 1165, 1959, which involves condensing a 3-indolecarboxaldehyde with ethyl cyanoacetate or diethyl malonate, reacting the condensed product with potassium cyanide in ethanol, and hydrolyzing the resulting cyano derivative with aqueous potassium hydroxide solution.

The 3-indolecarboxaldehydes can be prepared by reacting a 3-unsubstituted indole represented by the following formula:

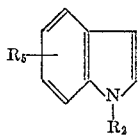

wherein $R_2$ and $R_5$ have the values noted above with phosphorus oxychloride in the presence of dimethylformamide using essentially the procedure described by Smith, J. Chem. Soc. 1954, 3842.

The starting indoles (Formulae III and IV above) utilized to prepare 3-indolesuccinic acids can be prepared by the processes disclosed in U.S. Patent 2,825,734.

The following examples are illustrative of the process and products of the present invention, but are not to be construed as limiting.

EXAMPLE 1

*Preparation of 2-(2-Methyl-3-Indolyl)-1,4-Butanediol and Dicarbamate*

A. 2-METHYL-3-INDOLESUCCINIC ACID

A mixture of 131.2 g. of 2-methylindole and 116.1 g. of maleic acid was mixed and heated on the steam bath. After 10 minutes the mixture melted and then started to solidify. The flask was removed from the bath and a vigorous reaction ensued. The mixture was allowed to stand for 30 minutes. A solution of 113 g. of potassium hydroxide in 1800 ml. of water was added and the mixture was heated on the steam bath with stirring for 40 minutes. The solution was cooled, decanted and extracted 4 times with 200-ml. portions of ether. It was then treated with 10 g. of decolorizing carbon while hot, filtered, cooled, acidified with 250 ml. of concentrated hydrochloric acid and allowed to crystallize in the refrigerator. The precipitate was recovered by filtration and washed with cold water to give 126.3 g. of 2-methyl-3-indolesuccinic acid melting at 210–211° C. (dec.).

The filtrate was extracted 4 times with 500-ml. portions of ether. The ethereal extracts were washed with saturated aqueous sodium chloride solution and evaporated to give 10.5 g. of a brown solid which melted at 183–200° C. On crystallization from 175 ml. of acetonitrile the product, 2-methyl-3-indolesuccinic acid, melted at 210–211° C. (dec.); weight, 5.0 g.

B. DIMETHYL 2-METHYL-3-INDOLESUCCINATE

A mixture of 131 g. of 2-methyl-3-indolesuccinic acid, 2300 ml. of methanol, and 47 ml. of concentrated sulfuric acid was refluxed for 24 hr. The solution was evaporated on the steam bath (1800 ml. of distillate was collected), cooled, and 1 liter of ether was added. The solution was then washed three times with water; a total of 1 liter of water was used. The aqueous washes were extracted twice with 500-ml. portions of ether and the combined organic solution was washed 4 times with 200-ml. portions of saturated aqueous sodium bicarbonate solution, then with saturated aqueous sodium chloride solution, dried with anhydrous sodium sulfate, and evaporated. The residue was crystallized from methanol to give 114.8 g. of material melting at 101–103° C. Recrystallization from benzene produced dimethyl 2-methyl-3-indolesuccinate which melted at 102–103° C.

C. 2-(2-METHYL-3-INDOLYL)-1,4-BUTANEDIOL

A solution of 97 g. of dimethyl 2-methyl-3-indolesuccinate in 300 ml. of benzene was added during one hour to a solution of 68 g. of lithium aluminum hydride in 3 l. of ether. The mixture was refluxed for 5.5 hr. and allowed to stand for 12 hours. It was then cooled in ice and decomposed with 100 ml. of water. The aqueous layer was extracted three times with ethyl acetate (total, 1 liter). The combined organic solution was washed with 250 ml. of saturated aqueous sodium bicarbonate solution, then with saturated aqueous sodium chloride solution, dried with anhydrous sodium sulfate, and evaporated to about 200 ml. Seeding induced crystallization which was allowed to proceed for about 12 hours in the refrigerator. The crystals were filtered and washed with ethyl acetate-petroleum ether (2:1 by volume) to produce 72 g. of 2-(2-methyl-3-indolyl)-1,4-butanediol which melted at 97–98.5° C.

*Anal.*—Calcd. for $C_{13}H_{17}NO_2$: C, 71.20; H, 7.82; N, 6.39. Found: C, 71.08; H, 8.05; N, 6.23.

The ultraviolet absorption spectrum of the compound (in ethanol) exhibited maxima at 226, 276, 283, and 290 millimicrons.

The infrared absorption spectrum of the compound (mineral oil mull) exhibited maxima at 3420, 3340, 3240, 1618, 1580 sh, 1575, and 1498 reciprocal centimeters.

D. 2-(2-METHYL-3-INDOLYL)-1,4-BUTANEDIOL DICARBAMATE 31.3 g. of phenyl chloroformate was added during a 15-minute period to an ice-cooled solution of 21.9 g. of 2-(2-methyl-3-indolyl)-1,4-butanediol in 180 ml. of pyridine. The initially formed lumps disintegrated to give a suspension and after stirring for about 12 hours, 1 liter of liquid ammonia was added to the suspension over a 15-minute period. The suspension was stirred for 6 hours under reflux and allowed to eliminate for 12 hours at 25° C. in order to evaporate ammonia. Pyridine was evaporated under reduced pressure and 100 ml. of water, 200 ml. of ether, and 200 ml. of ethyl acetate were added. The organic layer was washed three times with 100-ml. portions of 10% hydrochloric acid, then 5 times with 100-ml. portions of 5% aqueous sodium hydroxide solution, water, and saturated aqueous sodium chloride solution. The solution was filtered and the filtrate was dried with anhydrous sodium sulfate and evaporated, to give 34.1 g. of solids. The solids were dissolved in 100 ml. of acetone, 100 ml. of methylene chloride was added, and the solution was allowed to crystallize. On crystallization 16.9 g. of 2-(2-methyl-3-indolyl)-1,4-butanediol dicarbamate was obtained which melted at 154–155° C. On recrystallization from acetone-methylene chloride the compound melted at 155.5–156° C.

*Anal.*—Calcd. for $C_{15}H_{19}N_3O_4$: C, 59.00; H, 6.27; N, 13.76. Found: C, 58.70; H, 6.42; N, 13.68.

The ultraviolet absorption spectrum of the compound (in ethanol) exhibited maxima at 224, f 275, 279, 282, and 289 millimicrons.

The infrared absorption spectrum of the compound (mineral oil mull) exhibited maxima at 3470, 3425, 3310, 3200, 1723 sh, 1710, 1683, 1610, 1597, 1587, 1490, 1475, 1350 sh, 1330, 1075, and 1050 reciprocal centimeters.

EXAMPLE 2

*Preparation of 2-(1,2-Dimethyl-3-Indolyl)-1,4-Butanediol and Dicarbamate*

A. 1,2-DIMETHYLINDOLE

A mixture of 10.0 g. of sodium hydride and 100 ml. of dimethylformamide was cooled to approximately —50° C., and a solution of 52.4 g. of 2-methylindole and 160 ml. of dimethylformamide was added over a 30-minute period. When the evolution of hydrogen ceased 59.4 g. of methyl iodide was added over 30 minutes. The mixture was allowed to stand and warm to 25° C. The mixture was cautiously treated with 18.4 ml. of ethanol and filtered. The solid was washed with 50 ml. of dimethylformamide. The filtrates were combined and poured into 900 ml. of water. The mixture was refrigerated for 2 hr. and filtered. The precipitate was recovered and recrystallized from about 200 ml. of 90% methanol and then from 600 ml. of 50% methanol. The product, 1,2-dimethylindole, weighed 40.0 g. and melted at 57–59° C.

B. DIMETHYL 1,2-DIMETHYL-3-INDOLESUCCINATE

A mixture of 29.0 g. of 1,2-dimethylindole and 23.2 g. of maleic acid was warmed on the steam bath until a reaction commenced. The resulting solid was cooled and shaken with a solution of 16.0 g. of sodium hydroxide and 200 ml. of water. The mixture was extracted with ether and the layers were separated. The water layer was acidified, cooled, and filtered. The resulting solid was dissolved in 1500 ml. of 30% ethanol, mixed with decolorizing carbon, filtered, and upon cooling 21.2 g. of 1,2-dimethyl-3-indolesuccinic acid was obtained.

Twenty grams of 1,2-dimethyl-3-indolesuccinic acid was refluxed in 45 ml. of methanol containing 0.1 g. of p-toluenesulfonic acid. The solution was concentrated and the residue was recrystallized from methanol, yielding 14 g. of dimethyl 1,2-dimethyl-3-indolesuccinate which melted at 138–140° C.

C. 2-(1,2-DIMETHYL-3-INDOLYL)-1,4-BUTANEDIOL

A solution of 1.8 g. of dimethyl 1,2-dimethyl-3-indolesuccinate, 0.5 g. of 1,2-dimethyl-3-indolesuccinic acid, and 25 ml. of tetrahydrofuran was slowly added to a mixture of 1.4 g. of lithium aluminum hydride and 50 ml. of tetrahydrofuran. The mixture was refluxed for 6 hr. and 50 ml. of the tetrahydrofuran was distilled. The mixture was decomposed by the addition of wet ether, followed by water and aqueous potassium hydroxide solution. The mixture was filtered and the filtrate was dried with anhydrous potassium carbonate; solid material precipitated during the drying. This mixture was filtered and the solid was extracted with hot tetrahydrofuran. The filtrate and extract were combined and cooled to yield 0.5 g. of 2-(1,2-dimethyl-3-indolyl)1,4-butanediol which melted at 126–127° C.

*Anal.*—Calcd. for $C_{14}H_{19}NO_2$: C, 72.07; H, 8.20; N, 6.00. Found: C, 71.40; H, 7.91; N, 5.90.

The ultraviolet absorption spectrum of the compound (in ethanol) exhibited maxima at 228, 286, and 292 millimicrons.

The infrared absorption spectrum of the compound (mineral oil mull) exhibited maxima at 3280 sh, 3240, 1607, 1570, 1555, 1485, 1073, 1052, 1017, 1007, 730, and 687 reciprocal centimeters.

D. 2-(1,2-DIMETHYL-3-INDOLYL)-1,4-BUTANEDIOL DICARBAMATE

A mixture of 4.6 g. of 2-(1,2-dimethyl-3-indolyl)-1,4-butanediol, 3.4 g. of ethyl carbamate, 0.7 g. of aluminum isopropoxide, and 60 ml. of toluene was heated to reflux and the toluene was slowly distilled. As the toluene was distilled fresh toluene was added. After 4 hr. of refluxing the mixture was cooled to 50° C. and filtered. The solid was slurried in 2% hydrochloric acid and filtered. The solid was washed well with water, dissolved in acetone, and diluted with Skellysolve B (essentially a mixture of hexanes having a boiling range of 140–160° F.) to yield 3.4 g. of 2-(1,2-dimethyl-3-indolyl)-1,4-butanediol dicarbamate which melted at 168–169° C.

*Anal.*—Calcd. for $C_{16}H_{21}N_3O_4$: C, 60.17; H, 6.62; N, 13.15. Found: C, 60.02; H, 6.67; N, 13.01.

The ultraviolet absorption spectrum of the compound (in ethanol) exhibited maxima at 227, f 279, 285, and f 292 millimicrons.

The infrared absorption spectrum of the compound (mineral oil mull) exhibited maxima at 3480, 3420, 3300, 3260, 3190, 3120, 1710, 1614, 1350, 1097 sh, 1083, 1040, 1020, 783, 734, 715 sh and 674 reciprocal centimeters.

EXAMPLE 3

*Preparation of 2-[2-(p-Anisyl)-3-Indolyl]-1,4-Butanediol and Dicarbamate*

A. 2-(p-ANISYL)INDOLE

A mixture of 17.5 g. of p-methoxyacetophenone and 5 ml. of phenylhydrazine was heated on the steam bath for 10 minutes. It was then cooled to 25° C. and 20 g. of polyphosphoric acid was added. It was then heated to 60° C. (oil-bath temperature). When the internal temperature reached 140° C., the oil bath was removed and the temperature was allowed to rise to 200° C., at which point the mixture was cooled in ice to 180° C. and then further allowed to cool to 100° C. 100 ml. of water was added and the mixture was heated on the steam bath for 15 minutes. The resulting suspension was cooled, filtered, and the product was crystallized from ethanol, to yield 2-(p-anisyl)indole which melted at 229.5–230.5° C. Recrystallization from benzene gave colorless plates which melted at 230–231.5° C.

B. 2-(p-ANISYL)-3-INDOLESUCCINIC ACID

A mixture of 90.3 g. of 2-(p-anisyl)indole, 198.0 g. of maleic anhydride, and 810 ml. of acetic acid was refluxed for 30 minutes. The solution upon being cooled deposited 2-(p-anisyl)-3-indolesuccinic anhydride which was recovered by filtration, washed successively with acetic acid and ether, and dried; melting point, 236.5–238° C.; weight, 93.9 g.

The anhydride (92.7 g.) was heated on a steam bath for 10 minutes with 525 ml. of 10% aqueous sodium hydroxide solution. The resulting hot solution was treated with decolorizing carbon and filtered. The filtrate was cooled and then acidified with concentrated hydrochloric acid. The resulting precipitate was recovered by filtration, washed with water, and dried at reduced pressure at 25° C. There was thus obtained 97.5 g. of 2-(p-anisyl)-3-indolesuccinic acid which melted at 212–213° C.

C. DIMETHYL 2-(p-ANISYL)-3-INDOLESUCCINATE 0.3 g. of 2-(p-anisyl)-3-indolesuccinic acid was added to an ethereal solution of diazomethane prepared from 3.0 g. of N-methyl-N-nitroso-N'-nitroguanidine. After 20 hr. the solution was filtered and evaporated to dryness to give a substantially quantitative yield of dimethyl 2-(p-anisyl)-3-indolesuccinate. Two recrystallizations from methanol gave clusters of needles, which melted at 173.5–174° C.

*Anal.*—Calcd. for $C_{21}H_{21}NO_5$: C, 68.65; H, 5.76; N, 3.81. Found: C, 68.66; H, 5.48; N, 3.91.

D. 2-[2-(p-ANISYL)-3-INDOLYL]-1,4-BUTANEDIOL

A hot solution of 56.7 g. of dimethyl 2-(p-anisyl)-3-indolesuccinate in 800 ml. of benzene was treated with Magnesol (magnesium silicate complex) and filtered. The filtrate was added to a solution of 29.6 g. of lithium aluminum hydride in 1400 ml. of ether. 25 ml. of tetrahydrofuran was added to dissolve some of the diester which crystallized during the addition. The mixture was then refluxed with stirring for 6 hr. and allowed to stand for about 12 hours. The mixture was cooled in ice, decomposed with 44 ml. of water, followed by a solution of 88 ml. of concentrated sulfuric acid in 700 ml. of water. The aqueous layer was extracted 4 times with 250-ml. portions of ethyl acetate. The combined organic solution was washed twice with 100-ml. portions of 1 N sulfuric acid, then with 150 ml. of aqueous sodium bicarbonate solution, saturated aqueous sodium chloride solution, and dried with anhydrous sodium sulfate and evaporated to about 150 ml. About 250 ml. of petroleum ether (boiling range 30–60° C.) was added and the oil was seeded and allowed to stand for about 12 hours. The mixture was filtered to yield 47.3 g. of 2-[2-(p-anisyl)-3-indolyl]-1,4-butanediol which melted at 137–140° C. The compound was recrystallized several times from dilute methanol to give 2-[2-(p-anisyl)-3-indolyl]-1,4-butanediol methanol solvate which sintered at 102° C. and melted at 123–125° C.

*Anal.*—Calcd. for $C_{19}H_{21}NO_3 \cdot CH_3OH$: C, 69.95; H, 7.33; N, 4.08. Found: C, 70.20; H, 7.50; N, 4.21.

E. 2-[2-(p-ANISYL)-3-INDOLYL]-1,4-BUTANEDIOL DICARBAMATE 31.3 g. of phenyl chloroformate was added during 15 minutes to an ice-cooled solution of 31.1 g. of 2-[2-(p-anisyl)-3-indolyl]-1,4-butanediol in 180 ml. of pyridine. The initially formed lumps disintegrated to give a suspension after stirring for several hours. The mixture was stirred for 12 hours and then added during 15 minutes to 1 liter of liquid ammonia. The initially formed oil dissolved in about one-half hour and the solution was stirred for 6 hr. under reflux and allowed to stand for 12 hours at 25° C. in order to evaporate ammonia. The resulting suspension was concentrated under reduced pressure at 60° C. to eliminate the pyridine. 450 ml. of water and 150 ml. of ether were added. The suspension was then filtered and the filter cake was washed in succession with ether, water, and ether, to give 37.3 g. of 2-[2-(p-anisyl)-3-indolyl]-1,4-butanediol dicarbamate which melted at 204–206° C. On recrystallization from acetonitrile the compound melted at 206–207.5° C.

*Anal.*—Calcd. for $C_{21}H_{23}N_3O_5$: C, 63.46; H, 5.83; N, 10.58. Found: C, 63.34; H, 5.89; N, 10.32.

The ultraviolet absorption spectrum of the compound (in ethanol) exhibited maxima at pl 236 and 299 millimicrons.

The infrared absorption spectrum of the compound (mineral oil mull) exhibited maxima at 3380, 3260 sh, 3180 sh, 1700, 1660, 1625, 1612 sh, 1607 sh, 1568, and 1552 sh reciprocal centimeters.

EXAMPLE 4

*Preparation of 2-[1-Methyl-2-(p-Anisyl)-3-Indolyl]-1,4-Butanediol and Dicarbamate*

A. 1-METHYL-2-(p-ANISYL)INDOLE

A mixture of 100 g. of p-methoxyacetophenone and 81.2 g. of 1-methyl-1-phenylhydrazine was heated on the steam bath for one hour. A solution consisting of 1590 ml. of acetic acid and 380 ml. of sulfuric acid was added and the mixture was heated on the steam bath for 4 hr. The resulting brown solution was cooled and was then added to 1000 g. of ice and 2500 ml. of water. The resulting product was recovered by filtration and washed with water. Recrystallization from methanol gave 27 g. of 1-methyl-2-(p-anisyl)indole, which on another recrystallization from methanol melted at 119.5–120.5 C.

*Anal.*—Calcd. for $C_{16}H_{15}NO$: C, 80.98; H, 6.37; N, 5.90. Found: C, 81.02; H, 6.27; N, 5.70.

B. 1-METHYL-2-(p-ANISYL)-3-INDOLESUCCINIC ACID

In the same manner as shown in Example 3, part *B* 1-methyl-2-(p-anisyl)-3-indolesuccinic acid was prepared by using 1-methyl-2-(p-anisyl)indole instead of 2-(p-anisyl)indole. The compound melted at 219.5–221.5° C.

C. 2-[1-METHYL-2-(p-ANISYL)-3-INDOLYL]-1,4-BUTANEDIOL 7.06 g. of 1-methyl-2-(p-anisyl)-3-indolesuccinic acid was added in portions during a five-minute period to a solution of 3.8 g. of lithium aluminum hydride in 200 ml. of tetrahydrofuran. The mixture was refluxed with stirring for 2 hr., and was then allowed to stand for 12 hours. It was cooled in ice, 20 ml. of water was added, followed by the addition of a solution of 17 ml. of concentrated sulfuric acid in 770 ml. of water. An oily solid was obtained which solidified on cooling in ice. The product was recovered by filtration, washed with water, and crystallized from benzene-petroleum ether (boiling range 30–60° C.) to give 4.3 g. of 2-[1-methyl-2-(p-anisyl)-3-indolyl]-1,4-butanediol which melted at 119–122° C. After two more recrystallizations from benzene-petroleum ether the compound melted at 123.5–125.5° C.

*Anal.*—Calcd. for $C_{20}H_{23}NO_3$: C, 73.82; H, 7.12; N, 4.31. Found: C, 74.09; H, 7.35; N, 4.22.

The ultraviolet absorption spectrum of the compound (in ethanol) exhibited maxima at 232, f 246, and 293 millimicrons.

The infrared absorption spectrum of the compound (mineral oil mull) exhibited maxima at 3500, 3380, 1608, 1565, 1552, 1542, and 1503 reciprocal centimeters.

D. DIMETHYL 1-METHYL-2-(p-ANISYL)-3-INDOLESUCCINATE

A mixture of 42 g. of 1-methyl-2-(p-anisyl)-3-indolesuccinic acid, 520 ml. of methanol, and 10.5 ml. of concentrated sulfuric acid was refluxed for 24 hr. during which time crystallization occurred. The cooled suspension was filtered to give 39.5 g. of colorless material which partially melted at 129° C. and was almost completely melted at 225° C. The mixture was extracted with boiling benzene and the insoluble precipitate was removed by filtration. The filtrate was evaporated to dryness, and the residue was triturated with hot methanol, to give 35.2 g. of dimethyl 1-methyl-2-(p-anisyl)-3-indolesuccinate which melted at 128–129.5 C.

*Anal.*—Calcd. for $C_{22}H_{23}NO_5$: C, 69.28; H, 6.08; N, 3.67; OCH$_3$, 24.41. Found: C, 69.48; H, 5.99; N, 3.65; OCH$_3$, 25.06.

E. 2-[1-METHYL-2-(p-ANISYL)-3-INDOLYL]-1,4-BUTANEDIOL

A solution of 30 g. of dimethyl 1-methyl-2-(p-anisyl)-3-indolesuccinate in 250 ml. of benzene was treated in the hot with Magnesol, filtered, and cooled to about 25° C. The filtrate was then added during a 15-minute period to a solution of 15 g. of lithium aluminum hydrate in 700 ml. of ether. The mixture was stirred and refluxed for 7.5 hr. It was cooled in ice and decomposed with 22 ml. of water, followed by a solution of 44 ml. of concentrated sulfuric acid in 350 ml. of water. Ethyl acetate (500 ml.) was added and the layers separated. The aqueous layer was extracted 3 times with 200-ml. portions of ethyl acetate. The combined organic solution was washed twice with 100-ml. portions of 1 N sulfuric acid, then with 150 ml. aqueous sodium bicarbonate solution, twice with saturated aqueous sodium chloride solution, dried with anhydrous sodium sulfate, and evaporated to 80 ml. It was then seeded and allowed to crystallize in the refrigerator for about 12 hours. The precipitate, 2-[1-methyl - 2 - (p-anisyl) - 3 - indolyl]-1,4-butanediol, weighed 24 g.; it was identical with the product of Part C which was obtained via reduction of the free acid.

F. 2-[1-METHYL-2-(p-ANISYL)-3-INDOLYL]-1,4-BUTANE-DIOL DICARBAMATE

In the same manner as shown in Example 1, Part D, 2-[1-methyl - 2 - (p-anisyl) - 3 - indolyl]-1,4-butanediol dicarbamate was prepared by using 16.3 g. of 2-[1-methyl-2-(p-anisyl) - 3 - indolyl]-1,4-butanediol, 15.7 g. of phenyl chloroformate and 500 ml. of liquid ammonia. The resulting product, 2-[1-methyl-2-(p-anisyl) - 3 - indolyl]-1,4-butanediol dicarbamate, melted at 203–203.5° C. Recrystallization from acetonitrile produced clusters of colorless needles which melted at 204–204.5° C.

*Anal.*—Calcd. for $C_{22}H_{25}N_3O_5$: C, 64.22; H, 6.12; N, 10.21. Found: C, 63.91; H, 6.03; N, 10.11.

The ultraviolet absorption spectrum of the compound (in ethanol) exhibited maxima at 230 and 290 millimicrons.

The infrared absorption spectrum of the compound (mineral oil mull) exhibited maxima at 3410, 3310, 3260, 3180, 1680, 1645, 1612, 1570 sh, 1555 sh, 1505, 1338, 1325 sh, 1290, 1252, 1185, 1175, 1075, 1030 sh, 1022, and 1015 reciprocal centimeters.

EXAMPLE 5

*Preparation of 2-[2-(3,4,5-Trimethoxyphenyl)-3-Indolyl]-1,4-Butanediol*

A. 2-(3,4,5-TRIMETHOXYPHENYL)INDOLE 3,4,5-trimethoxyacetophenone was prepared by treating 3,4,5-trimethoxybenzoyl chloride (Perkin et al., J. Chem. Soc. 1906, 1655) with cadmium chloride and methylmagnesium iodide according to the procedure of Horning et al., J. Amer. Chem. Soc. 73, 5826, 1951.

A mixture of 10.8 g. of phenylhydrazine and 21 g. of 3,4,5-trimethoxyacetophenone was heated on the steam bath. A solution resulted which then solidified. It was cooled to about 25° C. and 41 g. of polyphosphoric acid was added. The mixture was heated on the steam bath with occasional stirring for one hour. The initially formed solution solidified, 400 ml. of water was then added, and the mixture was again heated on the steam bath for one-half hour. The resulting precipitate was recovered by filtration and washed with water. The washed precipitate was dissolved in 550 ml. of methanol and 100 ml. of acetone and the resulting mixture was treated with decolorizing carbon and filtered. The filtrate was evaporated until crystallization started. After crystallization was complete there was obtained 14.2 g. of 2-(3,4,5-trimethoxyphenyl) indole which melted at 205–206.5° C. On recrystallization from methanol-acetone the compound melted at 205.5–206.5° C.

*Anal.*—Calcd. for $C_{17}H_{17}NO_3$: C, 72.06; H, 6.05; N, 4.94; $OCH_3$, 32.86. Found: C, 71.74; H, 6.05; N, 5.01; $OCH_3$, 34.99.

B. DIMETHYL 2-(3,4,5-TRIMETHOXYPHENYL)-3-INDOLESUCCINATE

A finely ground mixture of 17.4 g. of 2-(3,4,5-trimethoxyphenyl)indole and 7.14 g. of maleic acid was heated in an oil bath. Reaction began at 140° C. and the temperature was raised to 175° C. during fifteen minutes. The dark green, solid reaction mixture was cooled, treated with a solution of 13.5 g. of potassium hydroxide in 155 ml. of water, and heated on the steam bath with stirring for 2 hrs. The reaction mixture was filtered and the filtrate was treated with decolorizing carbon, cooled in ice, and acidified with 36 ml. of concentrated hydrochloric acid. The resulting suspension was extracted twice with 200-ml. portions of ethyl acetate. The extracts were washed with saturated aqueous sodium chloride solution, and dried with anhydrous sodium sulfate. After treatment with decolorizing carbon the dark yellow solution was evaporated to dryness to give 15.6 g. of 2-(3,4,5-trimethoxyphenyl)-3-indolesuccinic acid.

A solution of 15.6 g. of 2-(3,4,5-trimethoxyphenyl)-3-indolesuccinic acid in 172 ml. of methanol containing 3.49 ml. of concentrated sulfuric acid was refluxed for 8 hrs. Crystallization started after refluxing for about 5 hrs. The mixture was cooled, filtered, and washed with methanol, to give 11.69 g. of dimethyl 2-(3,4,5-trimethoxyphenyl)-3-indolesuccinate which melted at 195–196.5° C. On recrystallization from methanol the compound melted at 195–197° C.

*Anal.*—Calcd. for $C_{23}H_{25}NO_7$: C, 64.62; H, 5.90; N, 3.28; $OCH_3$, 36.30. Found: C, 64.56; H, 5.77; N, 3.37; $OCH_3$, 38.00.

C. 2-[2-(3,4,5-TRIMETHOXYPHENYL)-3-INDOLYL]-1,4-BUTANEDIOL

A solution of 1.75 g. of dimethyl 2-(3,4,5-trimethoxyphenyl)-3-indolesuccinate in 25 ml. of tetrahydrofuran was added during ten minutes to a solution of 1 g. of lithium aluminum hydride in 75 ml. of ether. The mixture was refluxed for two hours and 20 minutes. It was then decomposed with 6 ml. of water, followed by a solution of 3 ml. of concentrated sulfuric acid in 30 ml. of water. The mixture was extracted twice with ethyl acetate and the extracts were then washed with 1 N sulfuric acid, then with aqueous sodium bicarbonate solution and saturated aqueous sodium chloride solution. The solution was dried with anhydrous sodium sulfate and evaporated under reduced pressure at 25° C. The resulting colorless residue was recrystallized from 50 ml. of benzene to produce 1.4 g. of 2-[2-(3,4,5-trimethoxyphenyl)-3-indolyl]-1,4-butanediol which melted at 147–149° C. On recrystallization from benzene the compound melted at 148–149.5° C.

*Anal.*—Calcd. for $C_{21}H_{25}NO_5$: C, 67.90; H, 6.78; N, 3.77; $OCH_3$, 25.07. Found: C, 68.04; H, 6.78; N, 3.88; $OCH_3$, 26.81.

EXAMPLE 6

*Preparation of 2-[2-(p-Hydroxyphenyl)-3-Indolyl]-1,4-Butanediol*

A. 2-(p-HYDROXYPHENYL)INDOLE

A mixture of 2.23 g. of 2-(p-methoxyphenyl)indole and 5.75 g. of pyridine hydrochloride was heated at 200–215° C. for 35 minutes. The dark solution was cooled, 75 ml. of water was added, and the solid was broken up until a suspension resulted. The gray precipitate was filtered, washed with water, and refluxed with 250 ml. of benzene. The mixture was then filtered and the filtrate was evaporated to produce 1.45 g. of 2-(p-hydroxyphenyl)indole which melted at 228–231° C. On recrystallization from benzene the compound melted at 231.5–232.5° C.

*Anal.*—Calcd. for $C_{14}H_{11}NO$: C, 80.36; H, 5.30; N, 6.69. Found: C, 80.27; H, 5.35; N, 6.61.

B. DIMETHYL 2-(p-HYDROXYPHENYL)-3-INDOLE-SUCCINATE

A finely ground mixture of 16.5 g. of 2-(p-hydroxyphenyl)indole and 9.16 g. of maleic acid was heated in an oil-bath. The reaction started at 143° C. and the temperature was raised to 178° C. during 15 minutes and maintained for about 3 minutes while the mixture was stirred with a glass rod. The mixture was cooled and a solution of 15 g. of potassium hydroxide in 300 ml. of water was added. The resulting brown solution was treated with decolorizing carbon, filtered, and acidified with concentrated hydrochloric acid, whereupon a gummy solid precipitated. The mixture was extracted three times with ethyl acetate, the extracts were washed with saturated aqueous sodium chloride solution, dried with anhydrous sodium sulfate, treated with decolorizing carbon and evaporated under reduced pressure at 25° C. to give 25.65 g. of 2-(p-hydroxyphenyl)-3-indolesuccinic acid.

A solution of 48 g. of 2-(p-hydroxphenyl)-3-indolesuccinic acid in 445 ml. of methanol containing 14.8 ml. of sulfuric acid was refluxed for three hours. It was then evaporated to about 50 ml. and diluted with water. The resulting precipitate was filtered, washed with water, and recrystallized from methanol to give 31.7 g. of dimethyl 2-(p-hydroxyphenyl)-3-indolesuccinate which melted at 196–197° C.

*Anal.*—Calcd. for $C_{20}H_{19}NO_5$: C, 67.98; H, 5.42; N, 3.96; $OCH_3$, 17.57. Found: C, 68.30; H, 5.41; N, 3.91; $OCH_3$, 16.99.

C. 2-[2-(p-HYDROXYPHENYL)-3-INDOLYL]-1,4-BUTANEDIOL

A solution of 31.7 g. of dimethyl 2-(p-hydroxyphenyl)-3-indolesuccinate in 150 ml. of tetrahydrofuran was added during one-half hour to a solution of 20.9 g. of lithium aluminum hydride in 2280 ml. of ether. The mixture was then refluxed for two hours, cooled in ice, and decomposed with water followed by dilute sulfuric acid. The aqueous layer was extracted three times with ethyl acetate, the combined extracts were washed twice with saturated aqueous sodium chloride solution, dried with anhydrous sodium sulfate, and evaporated under reduced pressure at 25° C. The product was crystallized from ethyl acetate to give 21.38 g. of 2-[2-(p-hydroxyphenyl)-3-indolyl]-1,4-butane-diol which melted at 160–162° C. On recrystallization from ethyl acetate the compound melted at 161–163° C.

*Anal.*—Calcd. for $C_{18}H_{19}NO_3$: C, 72.70; H, 6.44; N, 4.71. Found: C, 72.45; H, 6.34; N, 4.59.

The ultraviolet absorption spectrum of the compound (in ethanol) exhibited maxima at 241 and 301 millimicrons.

The infrared absorption spectrum of the compound (mineral oil mull) exhibited maxima at 3440, 3370, 3340, 3060, 2790 sh, 2710, 2670, 2600, 2480, 1615, 1603 sh, 1576, 1560, 1515, and 1490 reciprocal centimeters.

EXAMPLE 7

*Preparation of 2-[2-(p-Fluorophenyl)-3-Indolyl]-1,4-Butanediol*

A. 2-(p-FLUOROPHENYL)INDOLE

A mixture of 10.8 g. of phenylhydrazine and 14.8 g. of p-fluoroacetophenone was heated on the steam bath for 20 minutes. The resulting solution was cooled to 25° C. whereupon a solid resulted. 41 g. of polyphosphoric acid was added and the mixture was stirred. The temperature rose to 75° C. and after a few minutes the reaction mixture was heated on the steam bath. When the inside temperature reached 95° C. a vigorous reaction took place. The flask was immediately immersed in ice and the temperature rose to 120° C. When the temperature began to drop after a few minutes, the mixture was again heated on the steam bath for one-half hour. 200 ml. of water was added and after heating for 5 minutes on the steam bath a suspension resulted. The suspension was filtered and the brown solid was washed with water. The compound was recrystallized from benzene to give 14.2 g. of 2-(p-fluorophenyl)indole which melted at 190–191° C. On recrystallization from benzene the compound melted at 188.5–189.5° C.

*Anal.*—Calcd. for $C_{14}H_{10}FN$: C, 79.60; H, 4.77; F, 8.99; N, 6.63. Found: C, 79.40; H, 4.69; F, 9.20; N, 6.90.

B. DIMETHYL 2-(p-FLUOROPHENYL)-3-INDOLESUCCINATE

A finely ground mixture of 4.65 g. of 2-(p-fluorophenyl)indole and 2.55 g. of maleic acid was heated in an oil bath. Reaction started at 145° C. and the temperature was raised to 160° C. during 15 minutes. The mixture was cooled, a solution of 4.85 g. of potassium hydroxide in 55 ml. of water was added, and the suspension was heated for 1 hour on the steam bath. It was then filtered and the filtrate was treated with decolorizing carbon, cooled in ice, and acidified with 10 ml. of concentrated hydrochloric acid. The resulting suspension was extracted twice with ethyl acetate. The extracts were washed with water, saturated aqueous sodium chloride solution, dried with anhydrous sodium sulfate, treated with decolorizing carbon, and evaporated under reduced pressure at 25° C., to produce 4.0 g. of 2-(p-fluorophenyl)-3-indolesuccinic acid.

A solution of 4.0 g. of 2-(p-fluorophenyl)-3-indolesuccinic acid in 54 ml. of methanol containing 1.1 ml. of sulfuric acid was refluxed for eight hours and was allowed to stand for about 12 hours. It was evaporated to a small volume, diluted with 50 ml. of water, and the resulting solid was recovered by filtration and washed with water. On recrystallization from methanol, 3.0 g. of dimethyl 2-(p-fluorophenyl)-3-indolesuccinate was obtained which melted at 171–174° C. On recrystallization from methanol the compound melted at 174.5–175.5° C.

*Anal.*—Calcd. for $C_{20}H_{18}FNO_4$: C, 67.60; H, 5.10; N, 3.94. Found: C, 67.70; H, 4.89; N, 4.47.

C. 2-[2-(p-FLUOROPHENYL)-3-INDOLYL]-1,4-BUTANEDIOL

A solution of 2.35 g. of dimethyl 2-(p-fluorophenyl)-3-indolesuccinate in 60 ml. of benzene was added during 25 minutes to a solution of 1.63 g. of lithium aluminum hydride in 120 ml. of ether. The mixture was refluxed for 2.5 hr. It was decomposed with water, followed by dilute sulfuric acid. The aqueous layer was extracted twice with ethyl acetate. The combined organic solution was washed with 1 N sulfuric acid, then with saturated aqueous sodium bicarbonate solution, saturated aqueous sodium chloride solution, dried with anhydrous sodium sulfate, and evaporated under reduced pressure at 25° C. The resulting compound, 2-[2-(p-fluorophenyl)-3-indolyl]-1,4-butanediol, melted at 166–167° C. On recrystallization from benzene-methanol the compound melted at 166.5–167.5° C.

*Anal.*—Calcd. for $C_{18}H_{18}FNO_2$: C, 72.22; H, 6.06; F, 6.34; N, 4.78. Found: C, 72.57; H, 5.60; F, 6.70; N, 5.08.

The ultraviolet absorption spectrum of the compound (in ethanol) exhibited maxima at 227 and 298.5 millimicrons.

The infrared absorption spectrum of the compound (mineral oil mull) exhibited maxima at 3560, 3360, 3250, 3140, 1600, 1590, 1575, 1555, 1540 sh, 1504, 1495 sh, 1093, 1065, 1047, 1008, 850, 787, 760, 742, and 720 reciprocal centimeters.

EXAMPLE 8

*Preparation of 2-[1-Ethyl-2-(p-Ethoxyphenyl)-5-Benxyloxy-3-Indolyl]-1,4-Butanediol and Dicarbamate*

A. 1-ETHYL-2-(p-ETHOXYPHENYL)-5-BENZYLOXY-3-INDOLESUCCINIC ACID

In the same manner as shown in Example 1, Part A, 1 - ethyl - 2 - (p - ethoxyphenyl) - 5 - benzyloxy - 3-indolesuccinic acid was prepared by using 1-ethyl-2-(p-ethoxyphenyl)-5-benzyloxyindole instead of 2-methylindole.

B. DIMETHYL 1-ETHYL-2-(p-ETHOXYPHENYL)-5-BENZYLOXY-3-INDOLESUCCINATE

In the same manner as shown in Example 1, Part B, dimethyl 1 - ethyl - 2 - (p - ethoxyphenyl) - 5 - benzyloxy-3-indolesuccinate was prepared by using 1-ethyl-2-(p-ethoxyphenyl)-5-benzyloxy-3-indolesuccinic acid instead of 2-methyl-3-indolesuccinic acid.

C. 2-[1-ETHYL-2-(p-ETHOXYPHENYL)-5-BENZYLOXY-3-INDOLYL]-1,4-BUTANEDIOL

In the same manner as shown in Example 1, Part C, 2-[1 - ethyl - 2 - (p - ethoxyphenyl) - 5 - benzyloxy - 3-indolyl]-1,4-butanediol was prepared by using dimethyl 1 - ethyl - 2 - (p - ethoxyphenyl) - 5 - benzyloxy - 3- indolesuccinate instead of dimethyl 2-methyl-3-indolesuccinate.

D. 2-[1-ETHYL-2-(p-ETHOXYPHENYL)-5-BENZYLOXY-3-INDOLYL]-1,4-BUTANEDIOL DICARBAMATE

In the same manner as shown in Example 1, Part D, 2-[1 - ethyl - 2 - (p - ethoxyphenyl) - 5 - benzyloxy - 3-indolyl]-1,4-butanediol dicarbamate was prepared by using 2 - [1 - ethyl - 2 - (p - ethoxyphenyl) - 5 - benzyloxy-3-indolyl]-1,4-butanediol instead of 2-(2-methyl-3-indolyl)-1,4-butanediol.

EXAMPLE 9

*Preparation of 2-[1-Propyl-2-(p-Propoxyphenyl)-6-Methoxy-3-Indolyl]-1,4-Butanediol*

A. 1-PROPYL-2-(p-PROPOXYPHENYL)-6-METHOXY-3-INDOLESUCCINIC ACID

In the same manner as shown in Example 1, Part A, 1-propyl - 2 - (p - propoxyphenyl) - 6 - methoxy - 3-indolesuccinic acid was prepared by using 1-propyl-2-(p-propoxyphenyl)-6-methoxyindole instead of 2-methylindole.

B. DIMETHYL 1-PROPYL-2-(p-PROPOXYPHENYL)-6-METHOXY-3-INDOLESUCCINATE

In the same manner as shown in Example 1, Part B, dimethyl 1-propyl-2-(p-propoxyphenyl-6-methoxy - 3 - indolesuccinate was prepared by using 1-propyl-2-(p-propoxyphenyl)-6-methoxy-3-indolesuccinic acid instead of 2-methyl-3-indolesuccinic acid.

C. 2-[1-PROPYL-2-(p-PROPOXYPHENYL)-6-METHOXY-3-INDOLYL]-1,4-BUTANEDIOL

In the same manner as shown in Example 1, Part C, 2-[1-propyl-2-(p-propoxyphenyl)-6-methoxy-3-indolyl]-1,4-butanediol was prepared by using dimethyl 1-propyl-2-(p-propoxyphenyl)-6-methoxy-3-indolesuccinate instead of dimethyl 2-methyl-3-indolesuccinate.

EXAMPLE 10

*Preparation of 2-[1-Butyl-2-(p-Butoxyphenyl)-7-Benzyloxy-3-Indolyl]-1,4-Butanediol*

A. 1-BUTYL-2-(p-BUTOXYPHENYL)-7-BENZYLOXY-3-INDOLESUCCINIC ACID

In the same manner as shown in Example 1, Part A, 1-butyl-2-(p-butoxyphenyl)-7-benzyloxy - 3 - indolesuccinic acid was prepared by using 1-butyl-2-(p-butoxyphenyl)-7-benzyloxyindole instead of 2-methylindole.

B. DIETHYL 1-BUTYL-2-(p-BUTOXYPHENYL)-7-BENZYLOXY-3-INDOLESUCCINATE

In the same manner as shown in Example 1, Part B, diethyl 1-butyl-2-(p-butoxyphenyl)-7-benzyloxy-3-indolesuccinate was prepared by using 1-butyl-2-(p-butoxyphenyl)-7-benzyloxy-3-indolesuccinic acid and ethanol instead of 2-methyl-3-indolesuccinic acid and methanol.

C. 2-[1-BUTYL-2-(p-BUTOXYPHENYL)-7-BENZYLOXY-3-INDOLYL]-1,4-BUTANEDIOL

In the same manner as shown in Example 1, Part C, 2-[1-butyl-2-(p-butoxyphenyl)-7-benzyloxy-3-indolyl] - 1,4-butanediol was prepared by using diethyl 1-butyl-2-(p-butoxyphenyl)-7-benzyloxy-3-indolesuccinate instead of dimethyl 2-methyl-3-indolesuccinate.

EXAMPLE 11

*Preparation of 2-(1,2-Diethyl-5-Ethoxy-3-Indolyl)-1,4-Butanediol and Dicarbamate*

A. 1,2-DIETHYL-5-ETHOXY-3-INDOLESUCCINIC ACID

In the same manner as shown in Example 1, Part A, 1,2-diethyl-5-ethoxy-3-indolesuccinic acid was prepared by using 1,2-diethyl-5-ethoxyindole instead of 2-methylindole.

B. DIPROPYL 1,2-DIETHYL-5-ETHOXY-3-INDOLESUCCINATE

In the same manner as shown in Example 1, Part B, dipropyl 1,2-diethyl-5-ethoxy-3-indolesuccinate was prepared by using 1,2-diethyl-5-ethoxy-3-indolesuccinic acid and propanol instead of 2-methyl-3-indolesuccinic acid and methanol.

C. 2-(1,2-DIETHYL-5-ETHOXY-3-INDOLYL)-1,4-BUTANEDIOL

In the same manner as shown in Example 1, Part C, 2-(1,2-diethyl-5-ethoxy-3-indolyl)-1,4-butanediol was prepared by using dipropyl 1,2-diethyl-5-ethoxy-3-indolesuccinate instead of dimethyl 2-methyl-3-indolesuccinate.

D. 2-(1,2-DIETHYL-5-ETHOXY-3-INDOLYL)-1,4-BUTANEDIOL DICARBAMATE

In the same manner as shown in Example 1, Part D, 2-(1,2-diethyl-5-ethoxy-3-indolyl) - 1,4 - butanediol dicarbamate was prepared by using 2-(1,2-diethyl-5-ethoxy-3-indolyl)-1,4-butanediol instead of 2-(2-methyl-3-indolyl)-1,4-butanediol.

EXAMPLE 12

*Preparation of 2-(2-Propyl-6-Propoxy-3-Indolyl)-1,4-Butanediol*

A. 2-PROPYL-6-PROPOXY-3-INDOLESUCCINIC ACID

In the same manner as shown in Example 1, Part A, 2-propyl-6-propoxy-3-indolesuccinic acid was prepared by using 2-propyl-6-propoxyindole instead of 2-methylindole.

B. DIMETHYL 2-PROPYL-6-PROPOXY-3-INDOLESUCCINATE

In the same manner as shown in Example 1, Part B, dimethyl 2-propyl-6-propoxy-3-indolesuccinate was prepared by using 2-propyl-6-propoxy-3-indolesuccinic acid instead of 2-methyl-3-indolesuccinic acid.

C. 2-(2-PROPYL-6-PROPOXY-3-INDOLYL)-1,4-BUTANEDIOL

In the same manner as shown in Example 1, Part C, 2-(2-propyl-6-propoxy-3-indolyl)-1,4-butanediol was prepared by using dimethyl 2-propyl-6-propoxy-3-indolesuccinate instead of dimethyl 2-methyl-3-indolesuccinate.

EXAMPLE 13

*Preparation of 2-(1,2-Dibutyl-5-Butoxy-3-Indolyl)-1,4-Butanediol and Dicarbamate*

A. 1,2-DIBUTYL-5-BUTOXY-3-INDOLESUCCINIC ACID

In the same manner as shown in Example 1, Part A, 1,2-dibutyl-5-butoxy-3-indolesuccinic acid was prepared by using 1,2-dibutyl-5-butoxyindole instead of 2-methylindole.

B. DIMETHYL 1,2-DIBUTYL-5-BUTOXY-3-INDOLESUCCINATE

In the same manner as shown in Example 1, Part B, dimethyl 1,2-dibutyl-5-butoxy-3-indolesuccinate was prepared by using 1,2-dibutyl-5-butoxy-3-indolesuccinic acid instead of 2-methyl-3-indolesuccinic acid.

C. 2-(1,2-DIBUTYL-5-BUTOXY-3-INDOLYL)-1,4-BUTANEDIOL

In the same manner as shown in Example 1, Part C, 2-(1,2-dibutyl-5-butoxy-3-indolyl)-1,4-butanediol was prepared by using dimethyl 1,2-dibutyl-5-butoxy-3-indolesuccinate instead of dimethyl 2-methyl-3-indolesuccinate.

D. 2-(1,2-DIBUTYL-5-BUTOXY-3-INDOLYL)-1,4-BUTANEDIOL DICARBAMATE

In the same manner as shown in Example 1, Part D, 2-(1,2-dibutyl-5-butoxy-3-indolyl) - 1,4 - butanediol dicarbamate was prepared by using 2-(1,2-dibutyl-5-butoxy-3-indolyl)-1,4-butanediol instead of 2-(2-methyl-3-indolyl)-1,4-butanediol.

EXAMPLE 14

*Preparation of 2-[2-(3,4-Diethoxyphenyl)-3-Indolyl]-1,4-Butanediol*

A. 2-(3,4-DIETHOXYPHENYL)-3-INDOLESUCCINIC ACID

In the same manner as shown in Example 1, Part A, 2-(3,4-diethoxyphenyl)-3-indolesuccinic acid was prepared by using 2-(3,4-diethoxyphenyl)indole instead of 2-methylindole.

B. DIMETHYL 2-(3,4-DIETHOXYPHENYL)-3-INDOLE-SUCCINATE

In the same manner as shown in Example 1, Part B, dimethyl 2-(3,4-diethoxyphenyl)-3-indolesuccinate was prepared by using 2-(3,4-diethoxyphenyl)-3-indolesuccinic acid instead of 2-methyl-3-indolesuccinic acid.

C. 2-[2-(3,4-DIETHOXYPHENYL)-3-INDOLYL]-1,4-BUTANEDIOL

In the same manner as shown in Example 1, Part C, 2-[2-(3,4-diethoxyphenyl)-3-indolyl] - 1,4 - butanediol was prepared by using dimethyl 2-(3,4-diethoxyphenyl)-3-indolesuccinate instead of dimethyl 2-methyl-3-indolesuccinate.

EXAMPLE 15

*Preparation of 2-[1-Methyl-2-(3,4-Dipropoxyphenyl)-3-Indolyl]-1,4-Butanediol and Dicarbamate*

A. 1-METHYL-2-(3,4-DIPROPOXYPHENYL)-3-INDOLE-SUCCINIC ACID

In the same manner as shown in Example 1, Part A, 1-methyl-2-(3,4-dipropoxyphenyl)-3-indolesuccinic acid was prepared by using 1-methyl-2-(3,4-dipropoxyphenyl)indole instead of 2-methylindole.

B. DIMETHYL 1-METHYL-2-(3,4-DIPROPOXYPHENYL)-3-INDOLESUCCINATE

In the same manner as shown in Example 1, Part B, dimethyl 1 - methyl - 2 - (3,4 - dipropoxyphenyl) - 3 - indolesuccinate was prepared by using 1-methyl-2-(3,4-dipropoxyphenyl)-3-indolesuccinic acid instead of 2-methyl-3-indolesuccinic acid.

C. 2-[1-METHYL-2-(3,4-DIPROPOXYPHENYL)-3-INDOLYL]-1,4-BUTANEDIOL

In the same manner as shown in Example 1, Part C, 2-[1 - methyl - 2 - (3,4 - dipropoxyphenyl) - 3 - indolyl] - 1,4-butanediol was prepared by using dimethyl 1-methyl-2-(3,4-dipropoxyphenyl)-3-indolesuccinate instead of dimethyl 2-methyl-3-indolesuccinate.

D. 2-[1-METHYL-2-(3,4-DIPROPOXYPHENYL)-3-INDOLYL]-1,4-BUTANEDIOL DICARBAMATE

In the same manner as shown in Example 1, part D, 2-[1 - methyl - 2 - (3,4 - dipropoxyphenyl) - 3 - indolyl] - 1, 4-butanediol dicarbamate was prepared by using 2-[1-methyl - 2 - (3,4 - dipropoxyphenyl) - 3 - indolyl] - 1, 4-butanediol instead of 2-(2-methyl-3-indolyl)-1,4-butanediol.

EXAMPLE 16

*Preparation of 2-[1-Methyl-2-(p-Chlorophenyl)-4-Benzyloxy-3-Indolyl]-1,4-Butanediol*

A. 1-METHYL-2-(p-CHLOROPHENYL)-4-BENZYLOXY-3-INDOLESUCCINIC ACID

In the same manner as shown in Example 1, Part A, 1-methyl - 2 - (p - chlorophenyl) - 4 - benzyloxy - 3 -indolesuccinic acid was prepared by using 1-methyl-2-(p-chlorophenyl)-4-benzyloxyindole instead of 2-methylindole.

B. DIMETHYL 1-METHYL-2-(p-CHLOROPHENYL)-4-BENZYLOXY-3-INDOLESUCCINATE

In the same manner as shown in Example 1, Part B, dimethyl 1-methyl-2-(p-chlorophenyl)-4-benzyloxy-3-indolesuccinate was prepared by using 1-methyl-2-(p-chlorophenyl)-4-benzyloxy-3-indolesuccinic acid instead of 2-methyl-3-indolesuccinic acid.

C. 2-[1-METHYL-2-(p-CHLOROPHENYL)-4-BENZYLOXY-3-INDOLYL]-1,4-BUTANEDIOL

In the same manner as shown in Example 1, Part C, 2-[1 - methyl - 2 - (p - chlorophenyl) - 4 - benzyloxy - 3 -indolyl]-1,4-butanediol was prepared by using dimethyl 1 - methyl - 2 - (p - chlorophenyl) - 4 - benzyloxy - 3 -indolesuccinate instead of dimethyl 2-methyl-3-indolesuccinate.

EXAMPLE 17

*Preparation of 2-[2-(3,4-Dibromophenyl)-3-Indolyl]-1,4-Butanediol*

A. 2-(3,4-DIBROMOPHENYL)-3-INDOLESUCCINIC ACID

In the same manner as shown in Example 1, Part A, 2-(3,4-dibromophenyl)-3-indolesuccinic acid was prepared by using 2-(3,4-dibromophenyl)indole instead of 2-methylindole.

B. DIPROPYL 2-(3,4-DIBROMOPHENYL)-3-INDOLE-SUCCINATE

In the same manner as shown in Example 1, Part B, dipropyl 2-(3,4-dibromophenyl)-3-indolesuccinate was prepared by using 2-(3,4-dibromophenyl)-3-indolesuccinic acid and propanol instead of 2-methyl-3-indolesuccinic acid and methanol.

C. 2-[2-(3,4-DIBROMOPHENYL)-3-INDOLYL]-1,4-BUTANEDIOL

In the same manner as shown in Example 1, Part C, 2-[2-(3,4-dibromophenyl)-3-indolyl]-1,4-butanediol was prepared by using dipropyl 2-(3,4-dibromophenyl)-3-indolesuccinate instead of dimethyl 2-methyl-3-indolesuccinate.

EXAMPLE 18

*Preparation of 2[1-Propyl-2(3,4-Diiodophenyl)-3-Indolyl]-1,4-Butanediol*

A. 1-PROPYL-2-(3,4-DIIODOPHENYL)-3-INDOLESUCCINIC ACID

In the same manner as shown in Example 1, Part A, 1-propyl-2-(3,4-diiodophenyl)-3-indolesuccinic acid was prepared by using 1-propyl-2-(3,4-diiodophenyl)indole instead of 2-methylindole.

B. DIMETHYL 1-PROPYL-2-(3,4-DIIODOPHENYL)-3-INDOLESUCCINATE

In the same manner as shown in Example 1, Part B, dimethyl 1-propyl-2-(3,4-diiodophenyl)-3-indolesuccinate was prepared by using 1-propyl-2-(3,4-diiodophenyl)-3-indole-succinic acid instead of 2-methyl-3-indolesuccinic acid.

C. 2-[1-PROPYL-2-(3,4-DIIODOPHENYL)-3-INDOLYL]-1,4-BUTANEDIOL

In the same manner as shown in Example 1, Part C, 2-[1 - propyl - 2 - (3,4 - diiodophenyl) - 3 - indolyl] - 1,4 -butanediol was prepared by using dimethyl 1-propyl-2-(3, 4-diiodophenyl)-3-indolesuccinate instead of dimethyl 2-methyl-3-indolesuccinate.

EXAMPLE 19

*Preparation of 2-[1-Ethyl-2-(p-Ethoxyphenyl)-5-Hydroxy-3-Indolyl]-1,4-Butanediol*

A solution of 2-[1-ethyl-2-(p-ethoxyphenyl)-5-benzyloxy-3-indolyl]-1,4-butanediol (Example 8) in absolute methanol was shaken under fifty pounds hydrogen pressure in the presence of palladium-on-charcoal catalyst, and when sufficient hydrogen was absorbed the mixture was filtered. The filtrate was concentrated to dryness under reduced pressure to produce 2-[1-ethyl-2-(p-ethoxyphenyl)-5-hydroxy-3-indolyl]-1,4-butanediol.

EXAMPLE 20

*Preparation of 2-[1-Methyl-2-(p-Chlorophenyl)-4-Hydroxy-3-Indolyl]-1,4-Butanediol*

In the same manner as shown in Example 19, 2-[1-methyl - 2 - (p - chlorophenyl) - 4 - hydroxy - 3 - indolyl]-1,4-butanediol was prepared by using 2-[1-methyl-2-(p-chlorophenyl)-4-benzyloxy-3-indolyl]-1,4-butanediol (Example 16) instead of 2-[1-ethyl-2-(p-ethoxyphenyl)-5-benzyloxy-3-indolyl]-1,4-butanediol.

EXAMPLE 21

*Preparation of 2-[1-Ethyl-2-(3,4-Dihydroxyphenyl)-3-Indolyl]-1,4-Butanediol*

A. 1-ETHYL-2-(3,4-DIHYDROXYPHENYL)INDOLE

In the same manner as shown in Example 6, Part A, 1-ethyl-2-(3,4-dihydroxyphenyl)indole was prepared by using 1-ethyl-2-(3,4-dimethoxyphenyl)indole instead of 2-(p-methoxyphenyl)indole.

B. DIMETHYL 1-ETHYL-2-(3,4-DIHYDROXYPHENYL)-3-INDOLESUCCINATE

In the same manner as shown in Example 6, Part B, dimethyl 1-ethyl-2-(3,4-dihydroxyphenyl)-3-indolesuccinate was prepared by using 1-ethyl-2-(3,4-dihydroxyphenyl)indole instead of 2-(p-hydroxyphenyl)indole.

C. 2-[1-ETHYL-2-(3,4-DIHYDROXYPHENYL)-3-INDOLYL]-1,4-BUTANEDIOL

In the same manner as shown in Example 6, Part C, 2-[1-ethyl-2-(3,4-dihydroxyphenyl)-3-indolyl]-1,4-butanediol was prepared by using dimethyl 1-ethyl-2-(3,4-dihydroxyphenyl)-3-indolesuccinate instead of dimethyl 2-(p-hydroxyphenyl)-3-indolesuccinate.

EXAMPLE 22

*Preparation of 2-(2-Phenyl-3-Indolyl)-1,4-Butanediol*

A. 2-PHENYL-3-INDOLESUCCINIC ACID

In the same manner as shown in Example 3, Part B, 2-phenyl-3-indolesuccinic acid was prepared by using 2-phenylindole instead of 2-(p-anisyl)indole.

B. DIMETHYL 2-PHENYL-3-INDOLESUCCINATE

In the same manner as shown in Example 3, Part C, dimethyl 2-phenyl-3-indolesuccinate was prepared by using 2-phenyl-3-indolesuccinic acid instead of 2-(p-anisyl)-3-indolesuccinic acid.

C. 2-(2-PHENYL-3-INDOLYL)-1,4-BUTANEDIOL

In the same manner as shown in Example 3, Part D, 2-(2-phenyl-3-indolyl)-1,4-butanediol was prepared by using dimethyl 2-phenyl-3-indolesuccinate instead of dimethyl 2-(p-anisyl)-3-indolesuccinate.

EXAMPLE 23

*Preparation of 2-(3-Indolyl)-1,4-Butanediol and Dicarbamate*

Utilizing the procedure of Perron et al., supra, 3-indolesuccinic acid was prepared by condensing 3-indolecarboxaldehyde and diethyl malonate to produce ethyl 2-carbethoxy-3-(3-indolyl)acrylate, reacting the latter product with potassium cyanide in ethanol, and hydrolyzing the resulting ethyl 3-cyano-3-(3-indolyl)propionate with aqueous potassium hydroxide solution to produce 3-indolesuccinic acid.

In the same manner as shown in Example 1, Part B, dimethyl 3-indolesuccinate was prepared by using 3-indolesuccinic acid instead of 2-methyl-3-indolesuccinic acid.

In the same manner as shown in Example 1, Part C, 2-(3-indolyl)-1,4-butanediol was prepared by using dimethyl 3-indolesuccinate instead of dimethyl 2-methyl-3-indolesuccinate.

In the same manner as shown in Example 1, Part D, 2-(3-indolyl)-1,4-butanediol dicarbamate was prepared by using 2-(3-indolyl)-1,4-butanediol instead of 2-(2-methyl-3-indolyl)-1,4-butanediol.

EXAMPLE 24

*Preparation of 2-(1-Methyl-3-Indolyl)-1,4-Butanediol*

In the same manner as shown in Examples 1 and 23, 2-(1-methyl-3-indolyl)-,4-butanediol was prepared by using 1-methyl-3-indolecarboxaldehyde instead of 3-indolecarboxaldehyde.

EXAMPLE 25

*Preparation of 2-(5-Benzyloxy-3-Indolyl)-1,4-Butanediol*

In the same manner as shown in Examples 1 and 23, 2-(5-benzyloxy-3-indolyl)-1,4-butanediol was prepared by using 5-benzyloxy-3-indolecarboxaldehyde instead of 3-indolecarboxaldehyde.

We claim:

1. A compound represented by the formula:

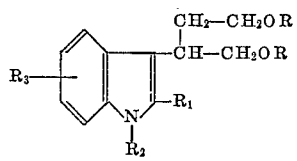

wherein R is selected from the group consisting of hydrogen and carbamyl, $R_1$ is selected from the group consisting of hydrogen, alkyl of from 1 to 4 carbon atoms, inclusive, phenyl, hydroxyphenyl, alkoxyphenyl wherein the alkoxy moiety is of from 1 to 4 carbon atoms, inclusive, and halophenyl, $R_2$ is selected from the group consisting of hydrogen and alkyl of from 1 to 4 carbon atoms, inclusive, and $R_3$ is selected from the group consisting of hydrogen, hydroxy, benzyloxy, and alkoxy of from 1 to 4 carbon atoms, inclusive.

2. 2-(3-indolyl)-1,4-butanediols represented by the formula:

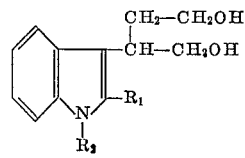

wherein $R_1$ and $R_2$ are alkyl of from 1 to 4 carbon atoms, inclusive.

3. 2-(3-indolyl)-1,4-butanediols represented by the formula:

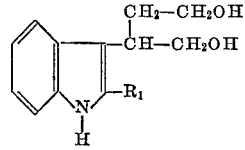

wherein $R_1$ is alkoxyphenyl and wherein the alkoxy moiety is of from 1 to 4 carbon atoms, inclusive.

4. 2-(3-indolyl)-1,4-butanediols represented by the formula:

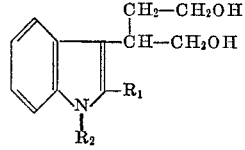

wherein $R_1$ is alkoxyphenyl and wherein the alkoxy moiety is of from 1 to 4 carbon atoms, inclusive, and $R_2$ is alkyl containing from 1 to 4 carbon atoms, inclusive.

5. 2-(3-indolyl)-1,4-butanediols represented by the formula:

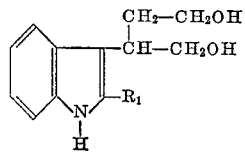

wherein $R_1$ is alkyl of from 1 to 4 carbon atoms, inclusive.

6. 2-(3-indolyl)-1,4-butanediols represented by the formula:

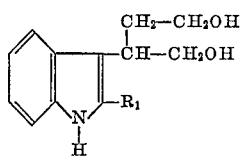

wherein $R_1$ is hydroxyphenyl.

7. 2-(3-indolyl)-1,4-butanediols represented by the formula:

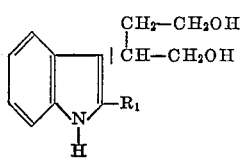

wherein $R_1$ is halophenyl.

8. 2-(2-methyl-3-indolyl)-1,4-butanediol.
9. 2-(2-methyl-3-indolyl)-1,4-butanediol dicarbamate.
10. 2-(1,2-dimethyl-3-indolyl)-1,4-butanediol.
11. 2 - (1,2 - dimethyl - 3 - indolyl) - 1,4 - butanediol dicarbamate.
12. 2-[2-(p-anisyl)-3-indolyl]-1,4-butanediol.
13. 2-[2-(p-anisyl)-3-indolyl]-1,4-butanediol dicarbamate.
14. 2-[1-methyl-2-(p-anisyl)-3-indolyl]-1,4-butanediol.
15. 2-[1-methyl-2-(p-anisyl)-3-indolyl]-1,4-butanediol dicarbamate.
16. 2 - [2 - 3,4,5 - trimethoxyphenyl) - 3 - indolyl]-1,4-butanediol.
17. 2-[2-(p-hydroxyphenyl)-3-indolyl]-1,4-butanediol.
18. 2-[2-(p-fluorophenyl)-3-indolyl]-1,4-butanediol.

References Cited in the file of this patent

Brown et al.: J. Chem. Soc., pages 3172–3176 (1952).
Bentley et al.: Biochemical Journal, vol. 64, pages 44–45 (1956).